United States Patent
Jackson et al.

(10) Patent No.: US 7,386,362 B1
(45) Date of Patent: Jun. 10, 2008

(54) SYSTEM FOR ADOPTING A MANUAL LATHE FOR USE WITH A COMPUTER CONTROLLED MILLING MACHINE

(75) Inventors: Gregory Todd Jackson, Middleton, WI (US); Edward Korn, Oregon, WI (US)

(73) Assignee: Tormach LLC, Waunakee, WI (US)

( * ) Notice: Subject to any disclaimer, the term of this patent is extended or adjusted under 35 U.S.C. 154(b) by 0 days.

(21) Appl. No.: 11/692,591

(22) Filed: Mar. 28, 2007

(51) Int. Cl.
*G06F 19/00* (2006.01)
*B27C 9/00* (2006.01)

(52) U.S. Cl. .................................. 700/160; 144/1.1

(58) Field of Classification Search ............... 700/159, 700/160, 178, 192; 483/14–17, 30; 29/27 C, 29/560; 142/53, 55; 144/1.1, 46–48
See application file for complete search history.

(56) References Cited

U.S. PATENT DOCUMENTS

| 4,057,893 A | 11/1977 | Smith |
| 4,867,020 A | 9/1989 | Compton |
| 4,951,376 A * | 8/1990 | Grund ..................... 483/14 |
| 5,301,405 A | 4/1994 | Maker |
| 5,333,657 A * | 8/1994 | Hart ....................... 142/24 |
| 5,535,652 A | 7/1996 | Beck |
| 5,586,382 A * | 12/1996 | Ganem ..................... 29/560 |
| 5,634,250 A | 6/1997 | Mihailovic |
| 6,629,549 B2 * | 10/2003 | Rioux ..................... 144/378 |
| 6,796,012 B2 * | 9/2004 | Geissler et al. ............ 29/27 C |

* cited by examiner

*Primary Examiner*—M. N. Von Buhr

(57) ABSTRACT

A machining system comprised of a computer controlled milling machine and a manual lathe mounted on the mill table provides an improved combination that will be advantageous for many machining operations. The machining system preserves the full functionality of both machines and allows them to work cooperatively together. The computer control capability of the milling machine can be used to machine complex surfaces on a workpiece rotating in the lathe. The workpiece can also be locked in a given rotational position so that traditional milling operations can be performed by the computer controlled milling machine. By sensing the rotational speed and position of the workpiece the system is able to provide the functionality of a computer controlled lathe at a fraction of the cost. The lathe can be easily and accurately mounted on the mill and easily removed from the mill to serve as a fully functional independent machine.

18 Claims, 5 Drawing Sheets

SYSTEM FOR ADOPTING A MANUAL LATHE FOR USE WITH A COMPUTER CONTROLLED MILLING MACHINE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates generally to milling machines, and in particular to the use of a computer controlled milling machine in combination with a lathe.

2. Description of the Prior Art

Computer controlled milling machines are well known devices in the machine tool art. They are used extensively to perform a variety of machining operations including drilling and cutting. In milling machines a removable tool, typically vertically oriented, is secured in and projects downward from the lower end of a power driven spindle which is movable along one axis. This tool is used to perform machining operations on a workpiece which is typically held on a horizontal table capable of movement along two or more different axes.

Lathes are also well known devices in the machine tool art. Lathes utilize a chuck and a rotatable spindle to hold a workpiece, typically in a horizontal position. A removable tool is secured to a table capable of movement in two or more directions and used to engage the rotating workpiece to perform various operations including cutting, drilling, reaming, and threading.

Both milling machines and lathes are separately and independently operable and many machine shops find it necessary to purchase both machines. Computer controlled machines are expensive and it is desirable to avoid the expense of purchasing both a computer controlled milling machine and a computer controlled lathe. In addition, it is desirable to perform multiple machining operations on a workpiece without the need to move the workpiece between different machines. Moving a workpiece between machines can result in loss of accuracy and also consumes time and effort.

Due to the expense associated with purchasing computer controlled machines there exists a need, especially in smaller shops or prototype shops, to achieve the functionality of a computer controlled lathe without incurring the expense of purchasing one. There also exists a need, in both small and large shops, to avoid the time, effort, and possible reduction in accuracy resulting from the need to move a workpiece between different machines to perform multiple operations.

These needs have been recognized in the prior art. The prior art includes different methods for mounting the components of a lathe on a mill. U.S. Pat. No. 4,057,893 (Smith) describes a lathe head and tail stock separately mounted to the table of a conventional computer controlled milling machine. In the Smith patent the tool holder and support are fixed to the stationary base of the mill. Positioning of the cutting tool relative to a workpiece held in the lathe head stock is achieved by moving the mill table while the cutting tool is held stationary. The lathe described in Smith is not capable of functioning as a lathe separately from the mill.

U.S. Pat. No. 5,301,405 (Maker) describes a milling machine lathe attachment consisting of a lathe head and a means for mounting the lathe head to the stationary base of the mill. In the Maker patent the cutting tool is attached to the movable lathe table and positioning of the cutting to relative to a workpiece held in the lathe head stock is achieved by moving the tool connected to the mill table. The lathe described in Maker is not capable of functioning as a lathe separately from the mill.

As discussed above, in the prior art the lathe components do not constitute a separately functional lathe. The lathe components are only functional when mounted to the mill. In addition, in the prior art the lathe components when mounted on a mill cannot provide complete computer controlled lathe capability. They are not capable of coordinating the movement of the cutting tool relative to the workpiece with the rotational speed and rotational position of the workpiece. Finally, the prior art requires the mounting and careful alignment of numerous lathe components on the mill. This requires time and effort and can result in loss of accuracy.

SUMMARY OF THE INVENTION

In view of the foregoing disadvantages inherent in the computer controlled milling machines and lathes existing in the prior art the present invention provides an improved combination of a computer controlled milling machine and a manual lathe that will be advantageous for many machining operations. The general purpose of the present invention, which will be described subsequently in greater detail, is to provide a new and improved way of combining a lathe with a computer controlled milling machine which has all of the advantages of the prior art milling machines and lathes and none of the disadvantages.

To achieve this purpose the present invention essentially comprises a manual lathe mounted on the bed of a computer controlled milling machine in a manner that preserves the full functionality of both machines and, at the same time, allows them to work cooperatively together. At all times both the computer controlled milling machine and the lathe retain their full functionality and either can be used independently, at any time, to perform machining operations on the workpiece. In addition, the computer control capability of the milling machine can be used to machine complex surfaces and contours on the workpiece mounted in the lathe. The lathe can be easily removed from the mill and will serve as a fully functional independent machine.

There has thus been broadly outlined the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the design of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the US Patent and Trademark Office, the public generally, and especially scientists, engineers and practitioners in the art not familiar with patent or legal terms or phraseology to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination of a computer controlled milling machine with a manual lathe which has all the advantages of prior art milling machines and lathes and none of the disadvantages.

It is another object of the present invention to allow both the lathe and the mill to retain full and complete functionality either when operating together or separately. All of the features and operating modes of the mill are available and functional at all times when the lathe is mounted on the mill. In addition, all of the features and functions of the lathe are available and functional when the lathe is mounted on the mill. The lathe is also independently functional as a standalone machine when it is removed from the mill.

It is a further object of the present invention to provide a way to communicate the rotational speed and angular position of the workpiece from the lathe to the mill so that complex shapes such as threads can be cut utilizing the computer control capabilities of the mill.

Still another object of the present invention is to provide a means for effectively fixing the rotational position of the workpiece mounted in the lathe chuck so that various milling operations can be performed on the stationary workpiece.

These, together with other objects of the invention, along with the various features of novelty which characterize the invention, are pointed out with particularity in the claims annexed to and forming a part of this disclosure. For a better understanding of the invention, its operating advantages, and specific objects attained by its uses, reference should be had to the accompanying drawings and descriptive material in which there is illustrated a preferred embodiment of the invention.

BRIEF DESCRIPTION OF THE DRAWINGS

The invention will be better understood and objects other than those set forth above will become apparent when consideration is given to the following detailed description of the preferred embodiment of the invention. Such description makes reference to the following drawings:

FIG. 4a is a magnified perspective view of the manual lathe mounted on the computer controlled milling machine table configured for milling operations and showing the locking pin.

DETAILED DESCRIPTION OF THE PREFERRED EMBODIMENT

Figure 1:
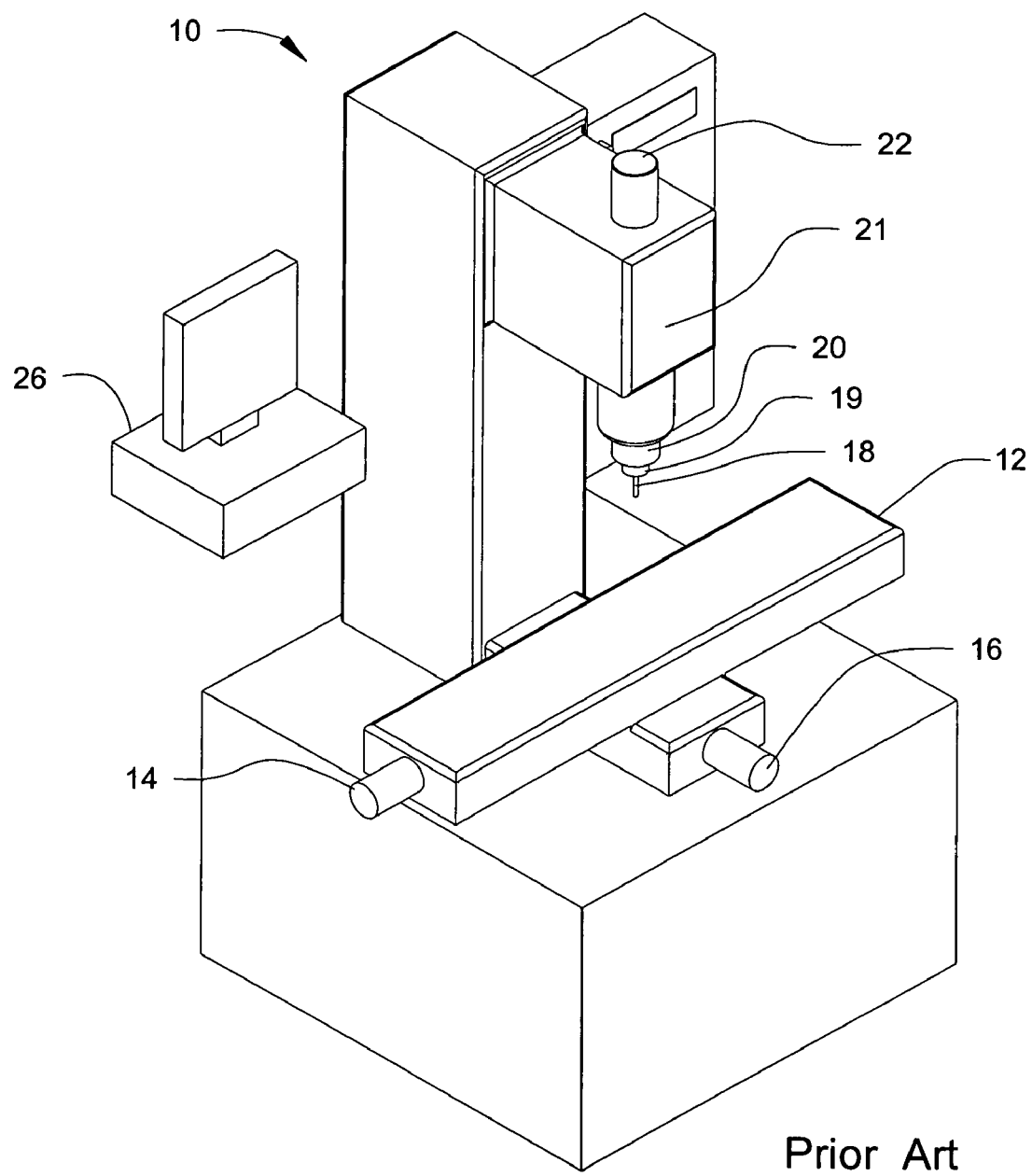
FIG. 1 is a perspective view of a computer controlled milling machine as utilized in the present invention.

With reference now to the drawings, wherein like numerals designate like parts, a conventional computer controlled milling machine 10 is shown in FIG. 1. The mill table 12 is capable of translation in one linear path by conventional driving means 14 and in a second linear path by conventional driving means 16. A cutting tool 18 is held in a rotatable spindle 19. Rotatable spindle 19 is mounted in nose 20 which is a part of spindle head 21. Spindle head 21 is capable of translation along a vertical path by conventional driving means 22. Driving means 14, 16 and 22 are operated under the control of a computer 26. The above construction and mode of operation is conventional and well-known to those skilled in the art and, for purposes of this invention, a more detailed description of a computer controlled milling machine is unnecessary.

Figure 2:
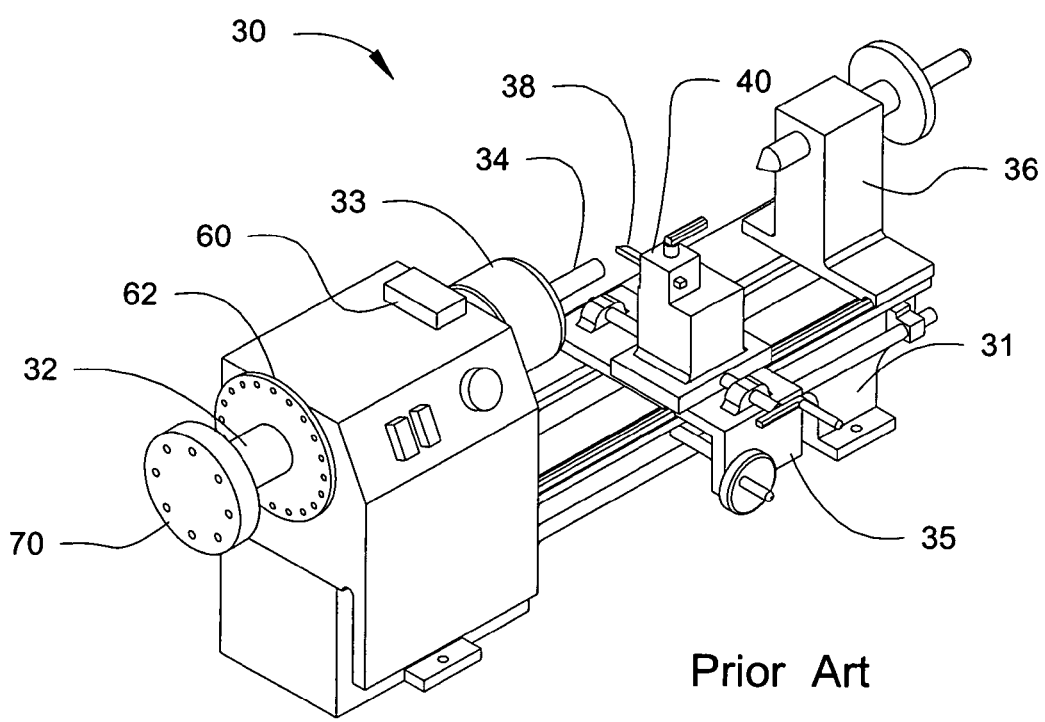
FIG. 2 is a perspective view of the manual lathe utilized in the present invention.

A lathe 30 is shown in FIG. 2. It includes a base 31, a rotating spindle 32, a chuck 33 with work clamping jaws capable of holding a workpiece 34, a tool holding table 35 capable of translation in a path parallel to the axes of rotation of rotating spindle 32 and perpendicular to the axes of rotation of rotating spindle 32, and a tailstock 36 for supporting long workpieces as they are being turned. A tool (or multiplicity of tools) 38 can be mounted in tool holder 40 to perform various operations on workpiece 34. The above construction and mode of operation is conventional and well-known to those skilled in the art and, for purposes of this invention, a more detailed description of a lathe is unnecessary.

In accordance with the present invention the described milling machine retains its full operational capability as a mill at all times. In addition, the described lathe retains its full manual operational capability as a lathe at all times. The invention involves the combination of a modified manual lathe with a computer controlled milling machine in a manner which enables the resulting system to obtain the capability of a computer controlled lathe at a minimal cost compared to the cost of a separate computer controlled lathe. In addition, the invention provides the capability to perform milling operations under computer control on a workpiece held in a fixed position in the lathe. Further, both the lathe and the mill retain independent functionality when mounted together or when mounted separately from each other. When separately mounted the lathe has the full capabilities of a manual lathe.

Figure 3:
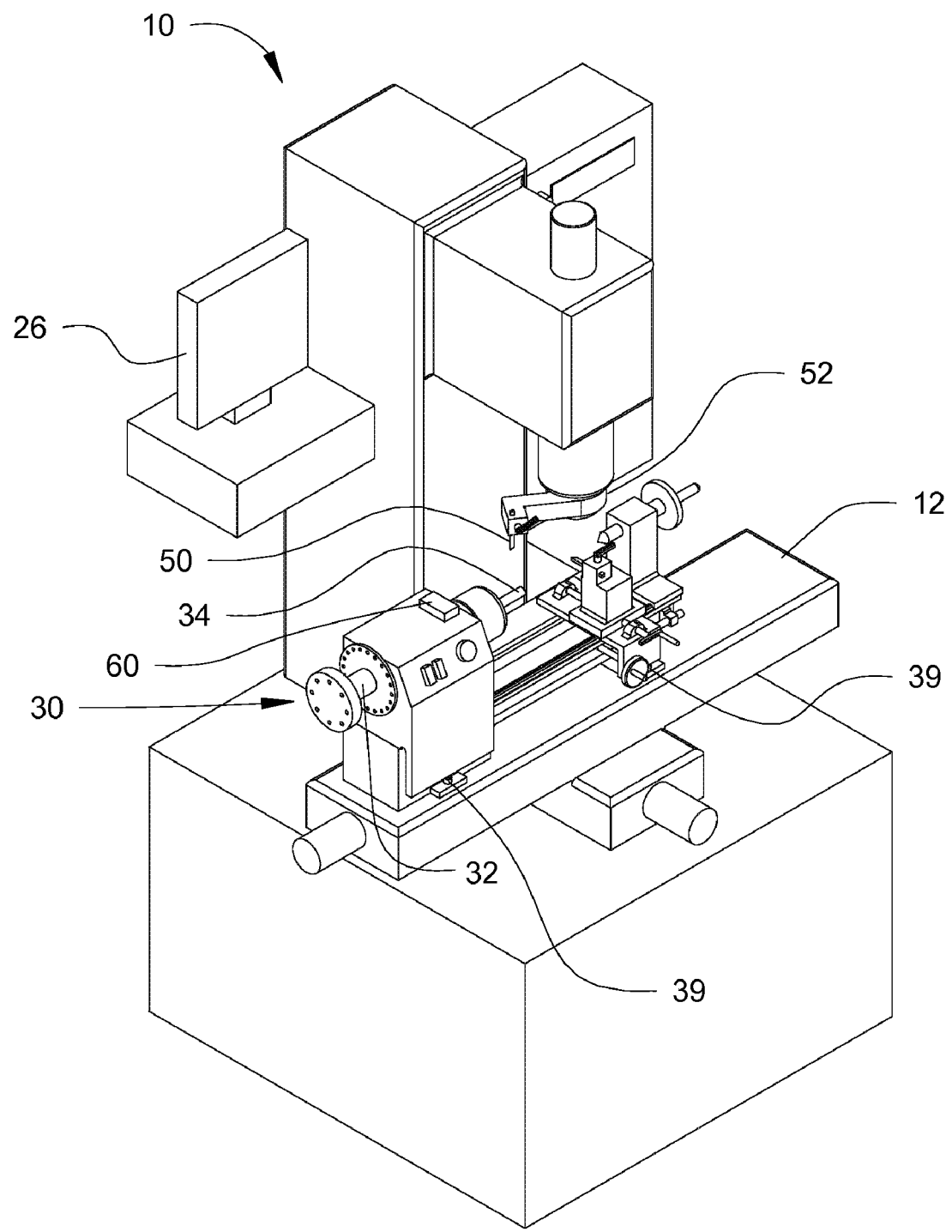
FIG. 3 is a perspective view of the manual lathe mounted on the computer controlled milling machine table configured for turning operations.

More particularly, as shown in FIG. 3, the invention comprises fixedly mounting on mill table 12 the lathe 30 using mounting means 39. A key feature of the present invention is mounting of a cutting tool 50 in a toolholder 52 which is clamped to nose 20. An indent, or other indexing feature, could be used to position toolholder 52 in a known angular position with respect to nose 20 if desired. This system allows full three axis computer control of the position of the cutting tool 50 relative to the workpiece 34 using driving means 14, 16 and 22. In addition, cutting tool 38, mounted in tool holder 40, can still be used to perform operations on workpiece 34 at any time. For operations requiring the removal of extremely small amounts of material it may be desirable to utilize the manually controlled tool holding table 35 and cutting tool 38 to perform finish cuts on the workpiece 34.

A second key feature of the invention is the mounting of a sensing means 60 on the lathe 30 capable of sensing the rotary position and speed of the rotating spindle 32. The sensing means is capable of transmitting a signal to the computer 26 indicating the rotary position and speed of the workpiece 34. Sensing means 60 is well-known to those skilled in the art and can consist of a standard optical tachometer in combination with any detectable feature on spindle 32. Sensing means 60 is not used or required when the lathe 30 is independently operated as a manual lathe. When the lathe 30 is mounted on the mill table 12 and the signal from sensing means 60 is transmitted to computer 26 the combined system provides the functionality of a fully computer controlled lathe at a small fraction of the cost.

The incremental cost required for the sensing means 60 is approximately $100. For this modest cost full computer controlled lathe capability is obtained by the invention. Utilizing the signal from sensing means 60 the rotational speed and position of a workpiece 34 are transmitted to the computer 26. Without knowledge of the rotational speed and position of the workpiece 34 it is not possible to cut complex shapes, such as threads, requiring multiple passes beginning at the same rotational position and requiring coordination of the movement of the cutting tool 50 in a direction parallel to the axis of rotation of workpiece 34 with its rotational speed. By transmitting knowledge of the rotational speed and position provided by sensing means 60 the system of the present invention obtains the full functionality of a computer controlled lathe costing many thousands of dollars at the cost of an inexpensive sensor. The system of the present invention is therefore able to cut complex shapes requiring multiple cuts that each begin at the same rotational position under full control of computer 26. The coordination of the feed rate of cutting tool 50 relative to workpiece 34 with the rotational speed of workpiece 34 is also accomplished under full control of computer 26 using the signal from sensing means 60.

Figure 4:
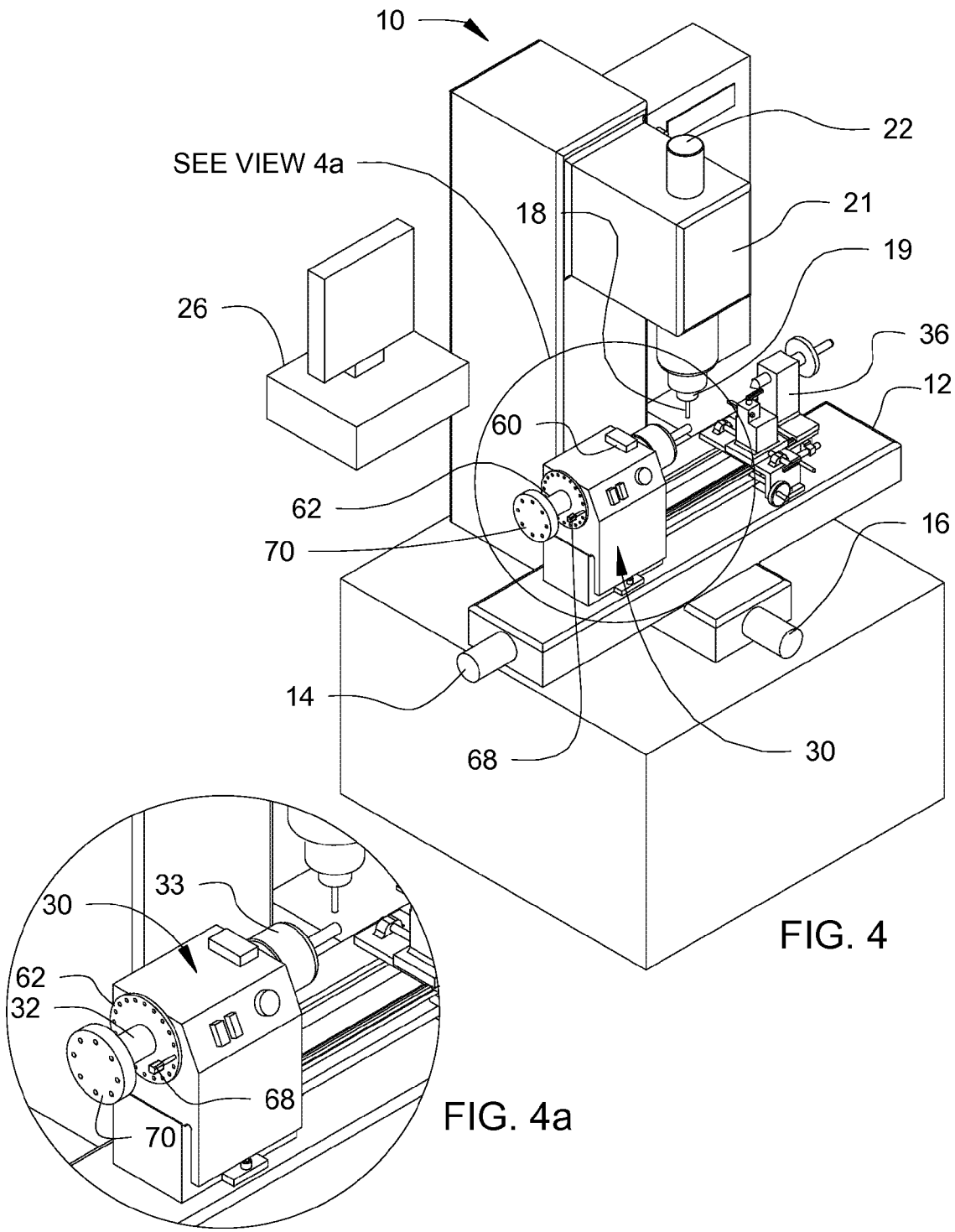
FIG. 4 is a perspective view of the manual lathe mounted on the computer controlled milling machine table configured for milling operations.

Still another feature of the invention, as shown in FIG. 4 and FIG. 4a is the ability to lock the rotating chuck 33 at a fixed angular position using locking means 62 to enable the workpiece 34 to be held in a fixed rotary position for machining by the computer controlled mill 10 using a cutting tool 18 held in spindle 19. Locking means 62 can consist of a disk with multiple holes distributed around its axes. Locking pin 68 can be inserted through any hole in locking disk 62 to fix the rotational position of spindle 32. In this mode of operation the relative position of the cutting tool 18 and workpiece 34 can be varied under the control of computer 26 by operating driving means 14, 16, and 22.

In a lathe which is not working cooperatively with a mill or other machine the locking means 62 would not be present. For the small incremental cost of adding locking means 62 to the lathe 30 the combined system of the present invention now has the capability to machine, under full computer control, grooves, flats, holes or other features on a workpiece 34 held in chuck 33. In addition, an electronic interlock can be used to disable powered rotation of spindle 32 by shutting off power to the lathe motor when locking pin 68 is engaged.

Figure 5:
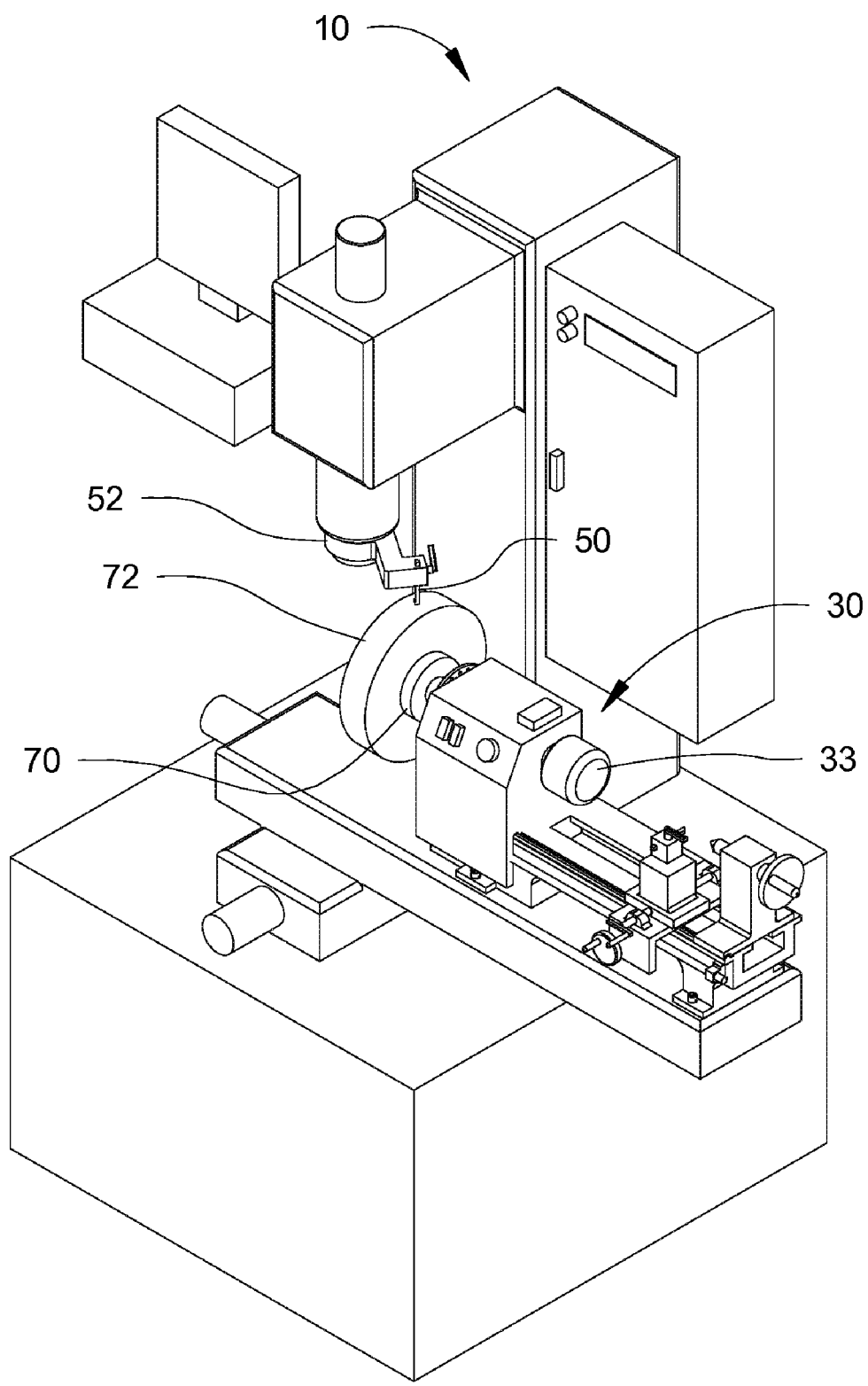
FIG. 5 is a perspective view of the manual lathe mounted on the computer controlled milling machine table and configured for turning large diameter pieces.

A still further feature of the present invention, as shown in FIG. 5, is the location of a second workpiece holding means 70 on lathe spindle 32. Workpiece holding means 70 is positioned on the opposite end of rotating spindle 32 from chuck 33. Using workpiece holding means 70 a larger diameter workpiece 72 can be turned than is possible with chuck 33. Workpiece holding means 70 can consist of a disk mounted on shaft 32 with a multiplicity of mounting holes distributed around the face of the disk for fastening workpiece 72.

Workpiece holding means 70 would not normally be present on a lathe used for turning metal because there would not be an effective way to hold a cutting tool to engage a workpiece mounted to workpiece holding means 70. When the lathe 30 is used in combination with the mill 10 in the present invention the cutting tool 50 mounted to the nose 20 of the mill 10 or the cutting tool 18 mounted the spindle 19 can be used to engage a workpiece mounting in workpiece holding means 70.

It can readily be seen that the invention is characterized by simplicity and economy of construction. It allows a machine shop to possess the capabilities of a fully computer controlled lathe at a fraction of the cost of such a machine. By incorporating the minor modifications of the present invention into a manual lathe the invention allows full computer control of the lathe when mounted on a computer controlled milling machine.

The advantages of the invention should now be readily apparent to those skilled in the art without the necessity for a more detailed description of the elements which are per se conventional, but which are utilized in the invention in unique combinations, making it possible to obtain results obtainable previously only possible by purchasing two separate costly computer-controlled machines.

With respect to the above description it is to be understood that the optimal dimensional relationships for the parts of the invention, to include variations in size, materials, shape, form, function and manner of operation, assembly, and use, are deemed readily apparent and obvious to one skilled in the art. All equivalent relationships to those illustrated in the drawings and described in the specification are intended to be encompassed by the present invention.

Therefore, the foregoing is to be considered as only illustrative of the principles of the invention. Since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A machining system comprising:
   a computer controlled milling machine;
   a manually controlled lathe mounted by fastening means on the horizontal mill table of said computer controlled milling machine; and
   a cutting tool mounted by clamping means to the spindle head of said computer controlled milling machine whereby said cutting tool can be moved vertically and said horizontal mill table can be moved horizontally by said computer controlled milling machine to engage a workpiece clamped in the rotating chuck of said manually controlled lathe with said cutting tool.

2. The machining system as defined in claim 1; and
   a second cutting tool or multiplicity of cutting tools mounted on the tool holder of said manually controlled lathe to manually engage said workpiece clamped in the rotating chuck of said manually controlled lathe with said second cutting tool.

3. The machining system as defined in claim 1; and signal means for determining the rotational position and rotational speed of said workpiece and transmitting a signal based on said determination to said computer controlled milling machine.

4. The machining system as defined in claim 3, wherein said signal means comprises an optical tachometer.

5. The machining system as defined in claim 2; and signal means for determining the rotational position and rotational speed of said workpiece and transmitting a signal based on said determination to said computer controlled milling machine.

6. The machining system as defined in claim 5, wherein said signal means comprises an optical encoder.

7. The machining system as defined in claim 1; and clamping means capable of fixing said workpiece at a given angular position.

8. The machining system as defined in claim 7; and electronic interlock means capable of shutting off power to the motor of said lathe when said clamping means is engaged.

9. The machining system as defined in claim 3; and clamping means capable of fixing said workpiece at a given angular position.

10. The machining system as defined in claim 9; and electronic interlock means capable of shutting off power to the motor of said lathe when said clamping means is engaged.

11. The machining system as defined in claim 1; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

12. The machining system as defined in claim 3; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

13. The machining system as defined in claim 4; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

14. The machining system as defined in claim 5; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

15. The machining system as defined in claim 7; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

16. The machining system as defined in claim 8; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

17. The machining system as defined in claim 9; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

18. The machining system as defined in claim 10; and a second workpiece mounting means located on the opposite end of the rotating spindle on said manually controlled lathe from the primary lathe chuck and extending beyond the base of said manually controlled lathe to allow the turning of a larger workpiece is than is possible with said workpiece mounted in said primary lathe chuck.

* * * * *